United States Patent [19]
Attia

[11] Patent Number: 6,079,197
[45] Date of Patent: Jun. 27, 2000

[54] HIGH TEMPERATURE COMPRESSION AND REHEAT GAS TURBINE CYCLE AND RELATED METHOD

[75] Inventor: Magdy S. Attia, Ormond Beach, Fla.

[73] Assignee: Siemens Westinghouse Power Corporation, Orlando, Fla.

[21] Appl. No.: 09/002,544

[22] Filed: Jan. 2, 1998

[51] Int. Cl.$^7$ .................................................. F02C 6/00
[52] U.S. Cl. .................... 60/39.04; 60/39.15; 60/39.17
[58] Field of Search ............................ 60/39.04, 39.15, 60/39.17, 39.41, 39.52, 269

[56] References Cited

U.S. PATENT DOCUMENTS

| | | | |
|---|---|---|---|
| 2,469,238 | 5/1949 | Newton | 60/102 |
| 2,755,621 | 7/1956 | Terrell | 60/39.16 |
| 3,204,406 | 9/1965 | Howes et al. | 60/39.17 |
| 3,765,170 | 10/1973 | Nakamura | 60/39.17 |
| 3,844,113 | 10/1974 | Lockwood, Jr. | |
| 3,867,811 | 2/1975 | Waeselynck | 60/39.03 |
| 4,271,665 | 6/1981 | Mandrin | 60/39.5 |
| 4,858,428 | 8/1989 | Paul | 60/39.17 |
| 5,313,782 | 5/1994 | Frutschi et al. | 60/39.17 |
| 5,347,806 | 9/1994 | Nakhamkin | 60/39.161 |
| 5,386,687 | 2/1995 | Frutsch | 60/39.04 |
| 5,454,220 | 10/1995 | Althaus et al. | 60/39.04 |
| 5,465,569 | 11/1995 | Althaus et al. | 60/39.03 |
| 5,577,378 | 11/1996 | Althaus et al. | 60/39.17 |

FOREIGN PATENT DOCUMENTS

WO 98 51912  11/1998  WIPO.

*Primary Examiner*—Louis J. Casaregola
*Attorney, Agent, or Firm*—Eckert Seamans Cherin & Mellott, LLC

[57] ABSTRACT

A high temperature compression and reheat gas turbine system, and method for operating the system, is disclosed. The system includes a low temperature compressor, a combustor, a high pressure turbine, a high temperature compressor, a reheat combustor, and a low pressure turbine. The high pressure turbine only partially expands the process gas. The high pressure compressor compresses the high pressure turbine exit gas stream before a reheat combustor raises the process gas stream enthalpy entering the low pressure turbine.

14 Claims, 3 Drawing Sheets

HIGH TEMPERATURE COMPRESSION AND REHEAT GAS TURBINE CYCLE AND RELATED METHOD

This invention was made with Government support under Contract No. DE-AC21-95MC32267 awarded by the Department of Energy. The Government has certain rights in this invention.

FIELD OF THE INVENTION

This invention relates to turbo machinery systems and, more particularly, to gas turbine systems.

BACKGROUND OF THE INVENTION

A simple gas turbine cycle comprises a compressor, a combustion chamber located downstream of the compressor, and a turbine located downstream of the combustor. FIG. 3 (Prior Art) shows a conventional simple turbine cycle comprising a compressor 116, a turbine section 114, a combustion chamber 118, and a combustor 112. Compressed air from the compressor 116 is directed to the combustion chamber 118 and into the combustor 112 in which fuel, for example, natural gas, is burned in the presence of the compressed air. Hot gases exit the combustor 112 and enter into the turbine 114 where the gas expands to drive a rotor shaft 120. The shaft 120 is also responsible for driving the compressor 116 which consumes a portion of the power output. The remainder of the power output is utilized to drive a generator rotor (not shown in FIG. 3), thereby producing electricity.

Various components of gas turbine cycles have been used to enhance system efficiency and power output. For example, U.S. Pat. No. 5,465,569, entitled "Method of Establishing Part-Load Operation in a Gas Turbine Group," to Althaus describes a gas turbine system having a reheat cycle. The reheat cycle includes a low pressure combustor and self-igniting low pressure turbine disposed downstream of a simple turbine system like that shown in FIG. 3. U.S. Pat. No. 3,765,170, entitled "Composite Gas Turbine Set," to Nakamura describes a gas turbine system having a regenerative cycle. The Nakamura '170 Pat. includes a standard cycle (including a heat exchanger) ported to a second heat exchanger. This system includes a main turbine and auxiliary turbine which accepts bleed air from the main compressor and directs the gas from the auxiliary turbine outlet to the main turbine inlet. U.S. Pat. No. 2,755,621, entitled "Gas Turbine Installations with Output Turbine By-Pass Matching the Output Turbine Pressure Drop," to Terrell discloses a gas turbine system having a separate output turbine to accept the main turbine exhaust with by-pass control. U.S. Pat. No. 5,313,782, "Combined Gas/Steam Power Station Plant," to Frutschi et al. describes a system having dual compressors with dual, in-line turbines including a reheater and auxiliary intercooler. Each of the patents listed herein is incorporated by reference in its entirety.

FIG. 2 shows an enthalpy versus entropy (h vs. s) diagram of various cycles. Curve 1 of FIG. 2 represents a simple turbine cycle and Curve 2 of FIG. 2 represents a simple turbine cycle augmented by a reheat cycle. Beginning with ambient air, a compressor compresses the air from p1 to p4. The combustion process increases the enthalpy of the gas to h1 by increasing its temperature. A turbine expands the gas to a pressure p1 to complete the simple turbine cycle.

In the reheat cycle, illustrated by Curve 2, the gas is partially expanded to a pressure P2 through the High Pressure Turbine (HPT) component, which generally consists of one stage. A second combustor reheats the gas in order to increase the work capacity of the gas. The reheat temperature is generally assumed to be equal to the maximum Turbine Inlet Temperature (TIT), i.e., that which corresponds to h1. Higher TIT's mean more work output and higher cycle efficiency. Since the limiting factor on increasing TIT is the material used to construct the first stage of the turbine, research is underway to produce stronger and more heat-resistant materials and coatings. The reheat cycle presents an alternative to producing more power through higher and higher TIT.

The net power produced by the cycle can simply be measured by subtracting the length of the line of the compression path (4a–4b) from the length of the line of the expansion path (6a–6d). Curves 1 and 2 show that the reheat cycle has a longer expansion path line because it has two expansions (i.e., 6a–6b and 8a–8b). The efficiency of the cycle, however, is measured by dividing the power output by the energy of the fuel being used. A measure of the losses is the entropy generated within the cycle, which is represented by the distance from S1 to S4 for the reheat cycle.

As shown by Curve 2, the reheat process is capable of producing power at the same level as the simple cycle but at lower temperatures, which results in lower costs and longer lasting turbine blades and a more efficient cycle (i.e. that uses less fuel than a simple cycle). Further, the reheat process can produce more power than the conventional simple cycle at comparable efficiency levels using the same maximum TIT.

Although the reheat cycle provides some advantages over the simple cycle, the cost of equipment and fuel associated with operating a gas turbine system are high. Therefore, it is an object of the present invention to produce a gas turbine system having high efficiency, high power output for a given size of the components, and minimum overall equipment cost.

SUMMARY

A gas turbine system having a high temperature compression and reheat cycle (HTCR) is provided. The first portion of the HTCR system includes a first compressor, a first combustor, and a first turbine. The first turbine may be a one or two stage high pressure turbine (HPT) that partially expands the process gas.

The second part of the HTCR system includes a second compressor, a reheat combustor, and a second turbine. The second compressor, which may be a single stage or a two stage high temperature compressor, compresses the process gas from the pressure at the first turbine outlet to a higher pressure. The reheat combustor heats the process gas to a higher temperature and raises its enthalpy. The second gas turbine, which may be a three stage or a four stage low pressure turbine (LPT), expands the gas. The corresponding method of operating the HTCR system, in accordance with the description above, is also provided.

The shaded region of FIG. 2 represents the increase in the area under the curve, which represents an increase to the overall efficiency of the HTCR cycle compared with the prior art reheat cycle shown in Curve 2. Furthermore, the inlet temperature to the low pressure turbine, which corresponds to enthalpy h1, of the HTCR cycle is achieved with the addition of much less second combustor fuel input compared with the reheat cycle represented by Curve 2 of FIG. 2.

The HTCR cycle according to the present invention has several advantages over both the simple and the reheat cycles. For example, the HTCR cycle is capable of producing considerably more power output than the simple cycle utilizing much less fuel than the reheat cycle. Further, the HTCR cycle is more efficient than the reheat cycle due to the decrease in entropy generation. Further, the LPT component of the HTCR cycle is capable of increase power generation because it receives inlet gas having a much higher pressure than that received by its counterpart in the prior art reheat cycle. Because the HTCR cycle presents a more efficient cycle that is capable of generating more power than either the simple cycle or the reheat cycle, enhanced efficiency and diminished equipment and fuel operating costs are achieved.

BRIEF DESCRIPTION OF THE DRAWINGS

The accompanying drawings are incorporated in and constitute a part of the specification to illustrate the preferred embodiment of the invention and, together with the description, serve to explain the principles of the invention.

DESCRIPTION OF THE PREFERRED EMBODIMENT

Figure 1:
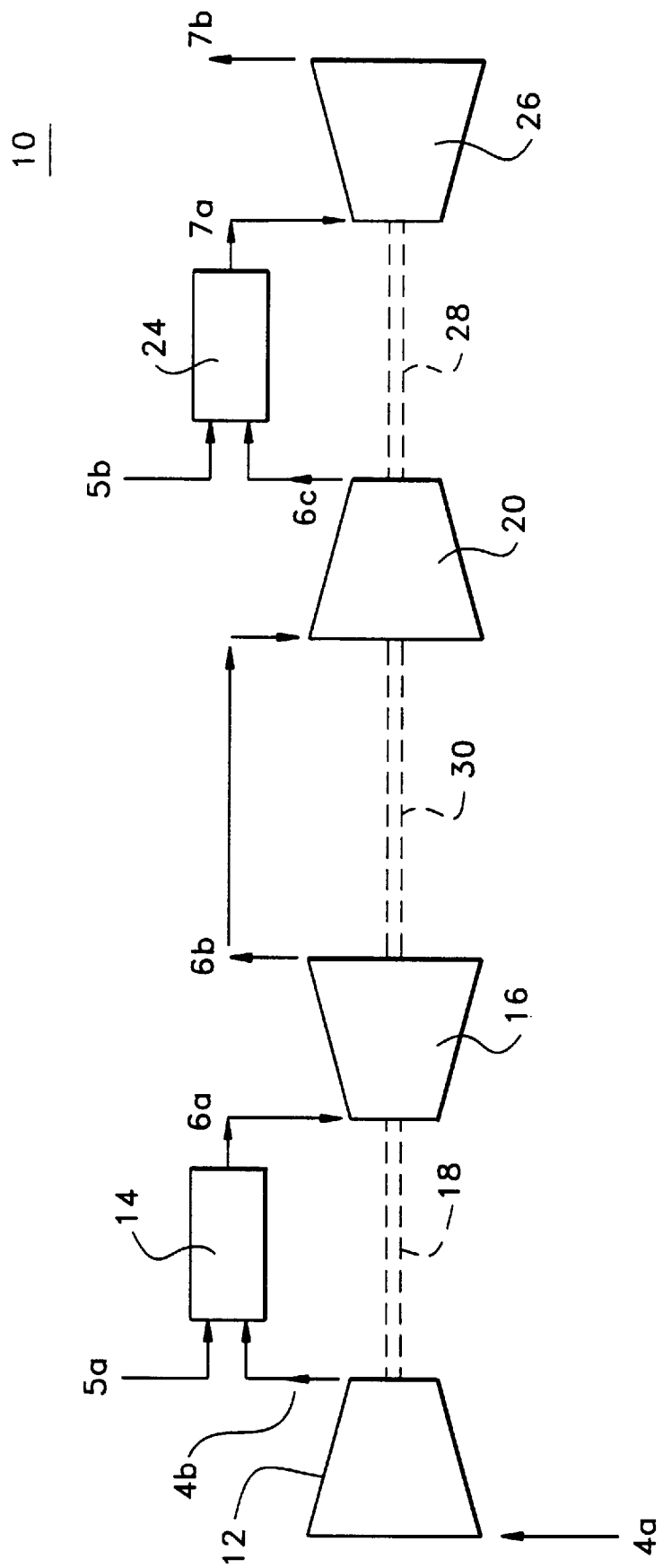
FIG. 1 is a schematic view according to the present invention.

FIG. 1 is a schematic view of the high temperature compression and reheat gas turbine system (HTCR) 10 according to the present invention. The HTCR system includes a first compressor 12, a first combustor 14, a first turbine 16, a second compressor 20, a second combustor 24, and a second turbine 26. For power generation applications, a single shaft machine is preferred. Alternatively, a multi-shaft or dual shaft machine may be employed. Specifically, the first compressor 12 and first turbine 16 may have a common shaft 18. The second compressor 20 and the second turbine 26 may have a common shaft 28. Also, first turbine 16 may have a common shaft 30 with second compressor 20. Shafts 18, 28, and 30 are shown in relief in FIG. 1 to illustrate that such interconnection may vary according to the design requirements of a particular system, as will be understood by persons familiar with such systems.

First compressor 12 is preferably a conventional compressor of the type employed in the simple cycle engine. For example, first compressor 12 may be a model ATS or 501G compressor having 16 or 20 stages as supplied by Westinghouse Electric Corporation, Pittsburgh, Pa. First turbine 16 is preferably a two stage, high pressure turbine. Second compressor 20 is preferably either a single stage or a two stage, high temperature compressor, although a single stage compressor is preferred because of its lower equipment cost. Second turbine 26 is preferably a three stage or a four stage low pressure turbine, and may also be a five stage low pressure turbine.

Figure 2:
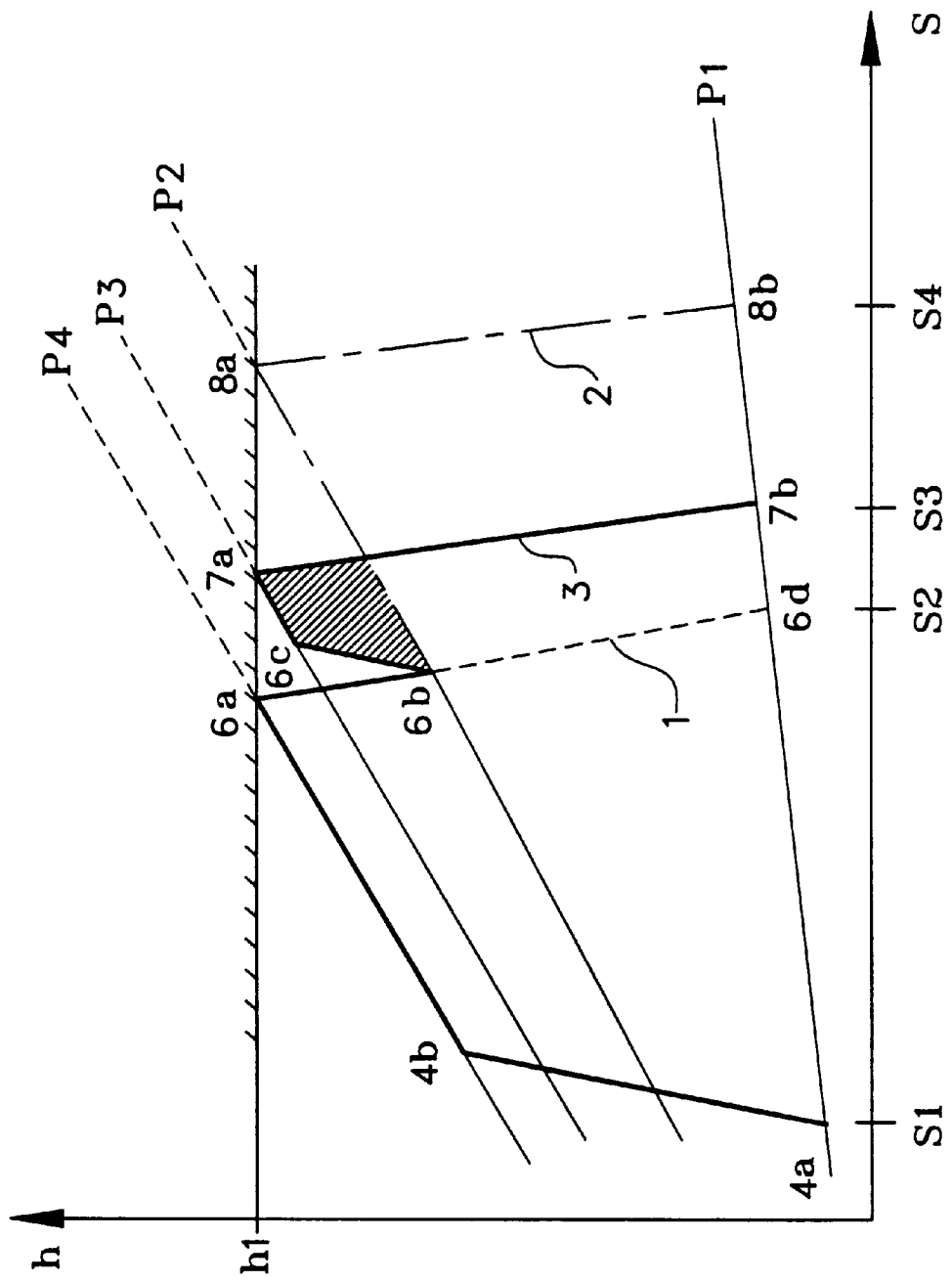
FIG. 2 is an enthalpy-entropy diagram illustrating the present invention.
Figure 3:
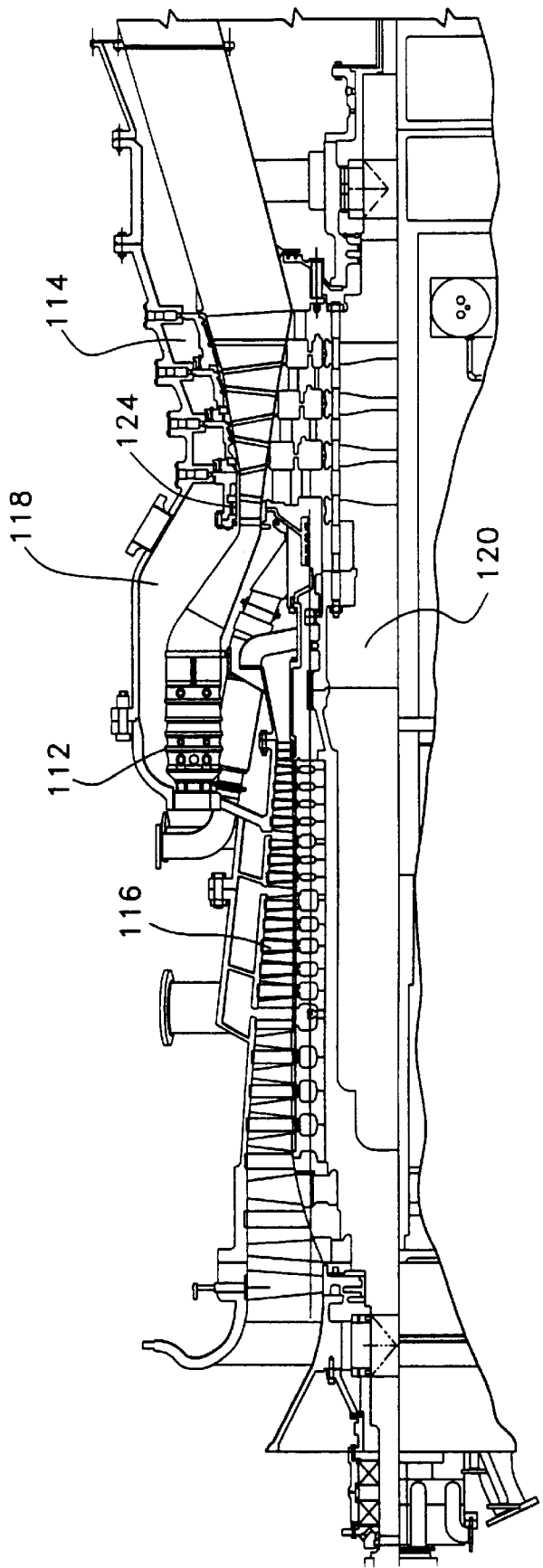
FIG. 3 (prior art) is a diagrammatical view of a simple turbine system.

Referring to FIGS. 1 and 2 to describe the operation of the gas turbine system 10, and to describe the method according to the present invention, an air stream 4a, preferably ambient air, enters low temperature compressor 12. Air stream 4a is compressed within low temperature compressor 12 to form compressed air stream 4b at pressure p4, as shown in FIG. 2. For clarity, some reference numerals that refer to a gas stream in FIG. 1 also illustrate, in FIG. 2, the particular properties of that gas stream at the point shown.

A fuel stream 5a and compressed air stream 4b are combusted within first combustor 14 to produce a first combustor exit gas stream 6a having an enthalpy h1. Fuel stream 5a may comprise any suitable fuel (for example, natural gas) as will be understood by persons familiar with such combustors and fuels. However, fuel stream 5a is not limited to a specific fuel nor even to a fuel in a gaseous state. Further, the term "gas turbine" as used in the specification and appended claims does not refer to a state of the fuel, but rather broadly refers to the type of turbine that may be suitably employed with the HTCR cycle, as will be understood by persons familiar with turbine cycles and equipment.

First combustor exit gas stream 6a is partially expanded through high pressure turbine 16 to produce a high pressure turbine exit gas stream 6b at pressure p2. High pressure compressor 20 compresses gas stream 6b to form a high pressure compressor exit stream 6c at pressure p3. A fuel stream 5b is combusted and combined with gas stream 6c in reheat combustor 24 to form reheat combustor exit gas stream 7a at enthalpy h1. Gas stream 7a may have an enthalpy h1 that is approximately equal to the enthalpy of gas stream 6a, as illustrated in FIG. 2. However, the present invention is not limited to such a relationship of enthalpy. Gas stream 7a is expanded through low pressure turbine 26 to produce a low pressure turbine exit gas 7b stream at pressure p1.

The instrumentation, control, operation, and interconnection of the components in the system according to the present invention will be apparent to those familiar with such components. The terms "system" and "cycle" are used interchangeably throughout this specification and appended claims.

The present invention may be embodied in other specific forms without departing from the spirit or essential attributes thereof. Specifically, the present invention is not limited to certain size or type of components, but rather, the HTCR cycle according to the present invention may be employed with any size or type of engine. Further, the present invention is not limited to a certain interconnection arrangement. For example, the HTCR cycle according to the present invention is equally applicable to circumstances in which all components reside on the same shaft (as typical to power generation engines), concentric shafts (as typical to aero engines), and on separate shafts (e.g., free shafts) Therefore, reference should be made to the appended claims, rather than to the foregoing specification, as indicating the scope of the invention.

What is claimed is:

1. A gas turbine system comprising:

a first compressor for producing a compressed air stream;

a first combustor, in flow communication with the first compressor, for combusting a fuel stream to produce a first combustor exit gas stream;

a first gas turbine, in flow communication with said first combustor, for partially expanding said first combustor exit gas stream to form a first turbine exit gas stream at a first temperature and pressure;

a second compressor, in flow communication with said first gas turbine, for receiving the first turbine exit gas stream at substantially the first temperature and pressure and compressing the first gas turbine exit gas stream to produce a second compressor exit gas stream;

a second combustor, in flow communication with said second compressor, for combusting fuel in the presence of the second compressor exit gas stream to produce a second combustor exit gas stream; and a second gas turbine, in flow communication with said second combustor, for expanding the second combustor exit gas stream to form a second gas turbine exit gas stream.

2. The gas turbine system of claim 1 wherein said first compressor comprises a low temperature compressor designed to compress an air stream at temperatures substantially below the first temperature.

3. The gas turbine system of claim 1 wherein said first turbine comprises a high pressure turbine.

4. The gas turbine system of claim 3 wherein said high pressure turbine comprises two turbine stages.

5. The gas turbine system of claim 1 wherein the second compressor comprises a high temperature compressor designed to compress the first turbine exit gas stream at substantially the first temperature.

6. The gas turbine system of claim 5 wherein said high temperature compressor comprises one of a one stage compressor and a two stage compressor.

7. The gas turbine system of claim 1 wherein said second combustor comprises a reheat combustor.

8. The gas turbine system of claim 1 wherein the second gas turbine comprises a low pressure turbine having three turbine stages.

9. The gas turbine system of claim 1 wherein the second gas turbine comprises a low pressure turbine having four turbine stages.

10. The gas turbine system of claim 1 wherein the second gas turbine comprises a low pressure turbine having at least five turbine stages.

11. A gas turbine system comprising:
   a first compressor for producing a compressed air stream;
   a first combustor, in flow communication with the first compressor, for combusting a fuel stream to produce a first combustor exit gas stream;
   a first gas turbine, in flow communication with said first combustor, for partially expanding said first combustor exit gas stream to form a first turbine exit gas stream;
   a second compressor, in flow communication with said first gas turbine, for receiving and compressing the first gas turbine exit gas stream to produce a second compressor exit gas stream;
   a second combustor, in flow communication with said second compressor, for combusting fuel in the presence of the second compressor exit gas stream to produce a second combustor exit gas stream;
   a second gas turbine, in flow communication with said second combustor, for expanding the second combustor exit gas stream to form a second gas turbine exit gas stream; and
   a common shaft coupled to each one of said first compressor, said first turbine, said second compressor, and said second turbine.

12. The gas turbine system of claim 1 further comprising a first shaft and a second shaft, said first shaft rotationally coupling said first compressor and said first gas turbine, said second shaft rotationally coupling said second compressor to said second gas turbine.

13. The gas turbine system of claim 12, wherein said first shaft and said second shaft are rotationally coupled together.

14. A method of operating a gas turbine system comprising a first compressor, a first combustor, a first gas turbine, a second compressor, a second combustor, and a second gas turbine, comprising the steps of:
   compressing air in the first compressor to produce a first compressed air stream;
   directing a fuel stream and said first compressed air stream to the first combustor;
   combusting said fuel stream in the presence of said first compressor air stream to produce a first combustor exit gas stream;
   partially expanding said first combustor exit gas stream in said first turbine to produce a first turbine exit gas stream at a first temperature and pressure;
   receiving said first turbine exit gas stream in the second compressor substantially at the first temperature and pressure;
   compressing said first turbine exit gas stream in the second compressor to produce a second compressor exit gas stream;
   directing a second fuel stream and said second compressor exit gas stream to the second combustor;
   combusting said second fuel stream in the presence of said second compressor exit gas stream to produce a second combustor exit gas stream; and
   expanding said second combustor exit gas stream in the second gas turbine.

* * * * *